Nov. 17, 1931.  F. C. McMANUS  1,831,871

INDIVIDUAL WHEEL MOUNTING

Filed June 19, 1929

Inventor:
Frank C. McManus,
By his Attorneys:
Redding, Greeley, O'Shea & Campbell Patented Nov. 17, 1931

1,831,871

UNITED STATES PATENT OFFICE

FRANK C. McMANUS, OF BROOKLYN, NEW YORK, ASSIGNOR TO INTERNATIONAL MOTOR COMPANY, OF NEW YORK, N. Y., A CORPORATION OF DELAWARE

INDIVIDUAL WHEEL MOUNTING

Application filed June 19, 1929. Serial No. 372,022.

The present invention relates to wheel mountings for vehicles and embodies, more specifically, an improved wheel mounting in which the driving wheels of motor vehicles are independently mounted upon the vehicle frame and driven by individual driving mechanisms.

Improved forms of drives have been designed for the purpose of mounting wheels individually upon vehicle frames and certain forms thereof have included drives which provide for movement of the wheels with respect to the frame in a plurality of planes. These drives have been mounted upon the axle housings which have been rigidly secured to the frames and provision for movement of the wheels in a plurality of planes has been made by incorporating a suitable connection between the wheel mountings and the axle housings.

The present invention embodies an improved form of mounting and drive for wheels of the above character in which the axle housings, as well as the wheel mountings, are mounted upon the frame with provision for rotative movement with respect thereto about the axis of the transmission shaft. Suitable means is provided for opposing yieldingly, such rotative movement and springs are mounted upon the frame to resist movement of the wheels in a vertical plane.

An object of the invention, accordingly, is to provide an improved form of mounting and drive for individually mounted wheels, the mounting providing for movement of the wheels in a plurality of planes with respect to the frame of the vehicle.

A further object of the invention is to provide an improved wheel mounting of the above character in which provision is made for movement of the axle housing about the axis of the transmission shaft, the wheel mountings being journaled upon the axle housing.

A further object of the invention is to provide a wheel mounting in which the wheels, wheel supports, and axle housings are mounted as a unit for movement in a plane transverse to the vehicle frame and rotatable about the axis of the transmission shaft.

Further objects of the invention, not specifically enumerated above, will be apparent as the invention is described in greater detail in connection with the accompanying drawings, wherein.

Figure 1:
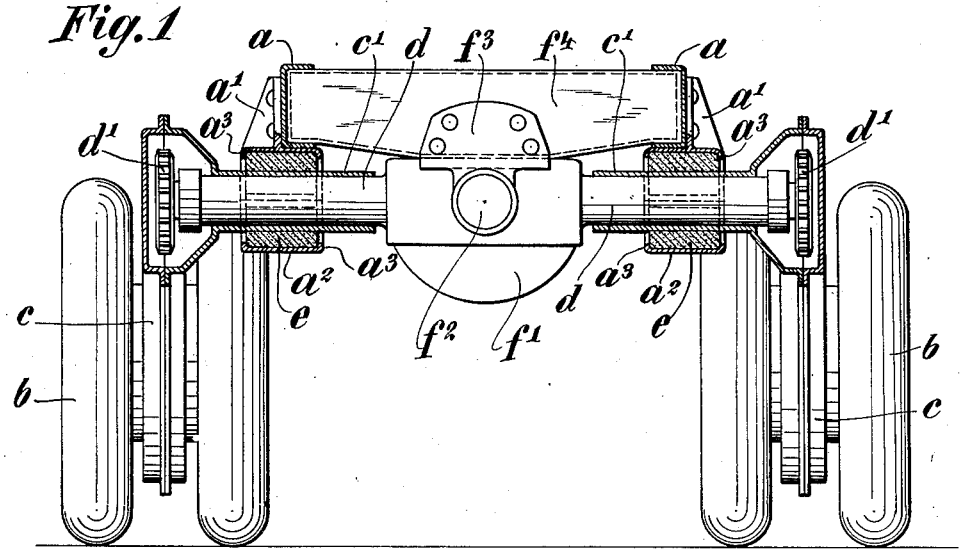
Figure 1 is a view in transverse elevation, partly in section, and showing a wheel mounting constructed in accordance with the present invention.
Figure 2:
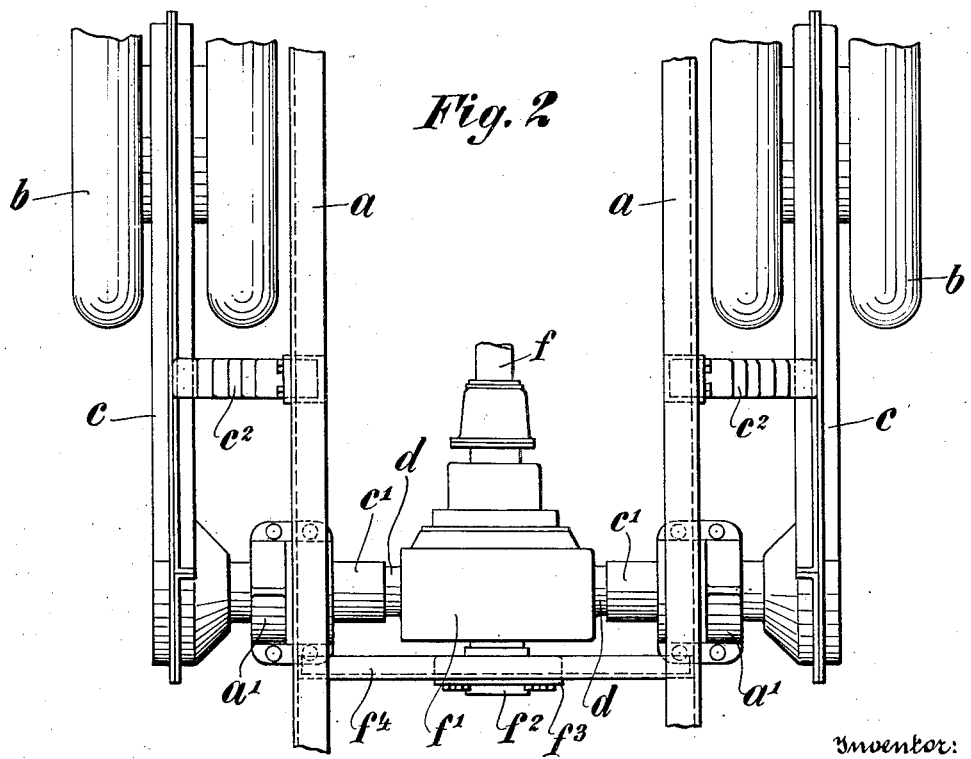
Figure 2 is a plan view showing the wheel mounting of Figure 1.

Referring to the above drawings, $a$ designates the side frame members of a vehicle chassis provided with brackets $a'$.

Brackets $a'$ are formed with covers $a^2$ which, with the brackets $a'$, form hollow cylindrical bearing surfaces. The edges of the brackets and covers are turned inwardly at $a^3$ to provide inwardly extending radial flanges.

Wheels $b$ are each mounted upon a wheel support $c$ which is preferably formed in two portions. The inner portion is formed with a sleeve $c'$ adapted to be journaled upon the appropriate axle housing $d$, thus permitting movement of the wheels in vertical planes. Blocks of yielding non-metallic material $e$ are carried by the brackets $a'$ and position the sleeve $c'$ with respect to the frame $a$.

The axle housings carry the usual jack shafts and driving sprockets $d'$ for driving the wheels $b$ in a well known manner. Vertical movement of the wheel support $c$ is yieldingly opposed by cantilever springs $c^2$ which are secured to the frame members $a$ and project outwardly, the ends thereof engaging suitable bosses formed in the wheel supports.

Transmission shaft $f$ drives a differential $f'$ which is journaled at $f^2$ in a bracket $f^3$ carried by a transverse support $f^4$. The support is mounted between the frame members and permits the differential $f'$ to turn upon an axis coincident with that of the transmission shaft $f$.

It will thus be seen that the wheels $b$, wheel supports $c$, and axle housings $d$ are mounted with provision for rotative movement about the axis of the trunnion bearing $f^2$. In addition, the wheels may move in a vertical plane about the axis of the axle housings $d$, and all movement of these elements is opposed by suitable cushioning members.

While the invention has been described with specific reference to the construction shown in the accompanying drawings, it is not to be limited, save as defined in the appended claim.

I claim as my invention:

A wheel mounting comprising a frame, a wheel, a wheel mounting, means to cushion relative movement between the wheel mounting and frame, an axle housing and differential housing, a trunnion bearing on the differential housing to journal the differential and axle housings upon a fore and aft longitudinal axis of the frame, a sleeve on the wheel mounting and journaled upon the axle housing, a bracket on the frame having an annular aperture through which the sleeve extends, and an annular block of yielding non-metallic material in the aperture, the axle housing being secured in the aperture by the non-metallic material.

This specification signed this 13th day of June, A. D. 1929.

FRANK C. McMANUS.